US010681029B2

(12) United States Patent
Krasnoperov et al.

(10) Patent No.: US 10,681,029 B2
(45) Date of Patent: Jun. 9, 2020

(54) METHOD OF SELECTING A WEBSITE FOR DISPLAYING IN A WEB BROWSER QUICK-ACCESS FIELD

(71) Applicant: YANDEX EUROPE AG, Lucerne (CH)

(72) Inventors: Dmitry Valeryevich Krasnoperov, Izhevsk (RU); Ilya Aleksandrovich Gubarev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 266 days.

(21) Appl. No.: 15/823,674

(22) Filed: Nov. 28, 2017

(65) Prior Publication Data

US 2018/0152431 A1   May 31, 2018

(30) Foreign Application Priority Data

Nov. 28, 2016   (RU) .................................. 2016146545

(51) Int. Cl.
*G06F 17/30* (2006.01)
*H04L 29/06* (2006.01)
(Continued)

(52) U.S. Cl.
CPC .............. *H04L 63/08* (2013.01); *G06F 16/95* (2019.01); *G06F 16/954* (2019.01); *H04L 67/02* (2013.01); *H04L 67/18* (2013.01); *H04L 63/1408* (2013.01)

(58) Field of Classification Search
USPC .......................................................... 726/7
See application file for complete search history.

(56) References Cited

U.S. PATENT DOCUMENTS 6,539,377 B1 * 3/2003 Culliss ................. G06F 16/337
7,810,035 B2 * 10/2010 Dominowska ........ G06F 16/954
                                                              715/739
(Continued)

FOREIGN PATENT DOCUMENTS

RU         2523930 C2    7/2014

OTHER PUBLICATIONS

"Tiles" (from MozillaWiki), https://wiki.mozilla.org/Tiles, accessed on Jun. 14, 2017, 3 pages.
(Continued)

*Primary Examiner* — Amare F Tabor
(74) *Attorney, Agent, or Firm* — BCF LLP

(57) ABSTRACT

A method of selecting websites for displaying in a quick-access field in a web browser is provided. The method includes receiving an indication of user's geographical data and selecting websites from two sub-sets of websites. The first subset of websites is based on popularity amongst other users associated with the user's geographical data. The second subset of websites is based on user's browsing history. Each of the web sites gets ranked based on: a first rank based on a popularity of the given website among some of users associated with the geographical data and a second rank for the given website based on the browser history data associated with the user. The method further includes generating a combined rank based on the first and second rank for each website from the first and second set of websites and using the combined rank for selecting web sites for display.

19 Claims, 5 Drawing Sheets

(51) Int. Cl.
*G06F 16/95* (2019.01)
*H04L 29/08* (2006.01)
*G06F 16/954* (2019.01)

(56) References Cited

U.S. PATENT DOCUMENTS

| | | | | |
|---|---|---|---|---|
| 8,600,968 | B2* | 12/2013 | Holenstein | G06F 16/955 |
| | | | | 707/706 |
| 8,645,300 | B1* | 2/2014 | Cowdrey | G06F 16/95 |
| | | | | 706/46 |
| 8,762,364 | B2* | 6/2014 | Parekh | G06F 16/9535 |
| | | | | 707/707 |
| 8,762,373 | B1* | 6/2014 | Zamir | G06F 16/9535 |
| | | | | 707/732 |
| 8,996,687 | B2* | 3/2015 | Zadig | H04L 12/66 |
| | | | | 709/224 |
| 9,026,530 | B2* | 5/2015 | Gouyet | G06Q 30/0242 |
| | | | | 707/736 |
| 9,147,000 | B2 | 9/2015 | Vasudevan et al. | |
| 10,223,456 | B2* | 3/2019 | Annau | G06F 17/276 |
| 2006/0282336 | A1* | 12/2006 | Huang | G06Q 30/00 |
| | | | | 705/26.61 |
| 2007/0260597 | A1* | 11/2007 | Cramer | G06Q 30/0244 |
| 2009/0234814 | A1* | 9/2009 | Boerries | G06Q 30/02 |
| 2014/0108968 | A1 | 4/2014 | Vishria | |
| 2014/0359424 | A1 | 12/2014 | Lin et al. | |

OTHER PUBLICATIONS

Search Report with regard to the counterpart RU Application No. 2016146545 completed Feb. 26, 2018.

* cited by examiner

| First set 310 | First rank Rg1 | Second rank Rh1 | Combined rank Rcom1 |
|---|---|---|---|
| www.53.com -3101 | 7 | 10 | 17 |
| www.myoptimalhealthchiro -3102 | 8 | 8 | 16 |
| www.clubcorp.com -3103 | 6 | 6 | 12 |
| http://acutabovechicago.com/ -3104 | 5 | 5 | 10 |
| www.barbarasbookstore.com -3105 | 8 | 4 | 12 |
| http://frenchaccent.biz/ -3106 | 6 | 3 | 9 |
| http://marketcreationscafe.com/ -3107 | 4 | 3 | 7 |
| http://starbucks.com/ -3108 | 10 | 4 | 14 |
| www.izito.us -3109 | 5 | 6 | 11 |
| www.uchicago.edu -3110 | 6 | 4 | 10 |
| www.cheapoair.com -3111 | 4 | 3 | 7 |
| www.lufthansa.com -3112 | 7 | 7 | 14 |
| www.metrarail.com -3113 | 4 | 6 | 10 |
| www.pacebus.com -3114 | 3 | 5 | 8 |
| www.yellowcabchicago.com -3115 | 3 | 9 | 12 |
| www.flatschicaho.com -3116 | 7 | 4 | 11 |
| www.abinternational.org -3117 | 8 | 3 | 11 |
| www.timeout.com -3118 | 5 | 5 | 10 |
| www.forbes.com -3119 | 10 | 9 | 19 |
| www.euronews.com -3120 | 10 | 10 | 20 |
| Second set 320 | First rank Rg2 | Second rank Rh2 | Combined rank Rcom2 |
| www.facebook.com -3202 | 10 | 10 | 20 |
| www.twitter.com -3203 | 8 | 4 | 12 |
| www.pinterest.com -3204 | 8 | 3 | 11 |
| www.chicago.eat24hours.com -3205 | 7 | 4 | 11 |
| www.petfoodzoom.com -3206 | 5 | 7 | 12 |
| www.kidssciencelab.com -3207 | 4 | 7 | 11 |
| www.wikipedia.org -3208 | 10 | 10 | 20 |
| www.merriam-webster.com -3209 | 4 | 10 | 14 |
| www.thefreedictionary.com -3210 | 5 | 9 | 14 |
| www.brittanica.com -3211 | 7 | 10 | 17 |
| www.nature.com -3212 | 4 | 6 | 10 |
| www.psychology.okstate.edu.com -3213 | 6 | 7 | 13 |
| www.alz.org -3214 | 2 | 8 | 10 |
| www.worldobesity.org -3215 | 3 | 10 | 13 |
| www.human-memory.net -3216 | 3 | 10 | 13 |
| www.amazon.com -3217 | 10 | 6 | 16 |
| www.ebay.com -3218 | 10 | 4 | 14 |
| www.nbcnews.com -3219 | 9 | 8 | 17 |
| www.bbc.co.uk -3220 | 9 | 10 | 19 |

FIG. 3

METHOD OF SELECTING A WEBSITE FOR DISPLAYING IN A WEB BROWSER QUICK-ACCESS FIELD

CROSS-REFERENCE

The present application claims priority to Russian Patent Application 2016146545, filed on Nov. 28, 2016, entitled, "СПОСОБ ВЫБОРА ВЕБ-САЙТА ДЛЯ ОБЛАСТИ БЫСТРОГО ДОСТУПА ВЕБ- БРАУЗЕРЕ," the entirety of which is incorporated herein by reference.

TECHNICAL FIELD

Present technology is directed to web browsers in general and specifically to the method of selecting a website for displaying in a web browser quick-access field.

BACKGROUND

When a computer user is desirous of surfing the Internet to visit a webpage of a particular website, etc., the user uses typically a web browser. In fact, the main purpose of the web browser is to display websites. The user interfaces of several browsers have common interface features. These common interface features include, as an example,—an address line for the entry of a URL (Universal Resource Locator), navigation buttons, refresh and stop-load buttons, homepage buttons and bookmark menu (for enabling the user to create and organize bookmarks).

However, most well-known browsers, such as Google Chrome™, Firefox™ Opera™ and Yandex.Browser™ are typically have a quick-access field, which is also known as an "express panel". In most web browsers, the quick-access field primarily contains shortcuts indicating the electronic address of the most frequently-visited websites. As a general rule, in typical web browsers, the quick-access field is allows the user to configure the quick-access field as to better correspond to the user's preferences. In other words, most web browsers execute the quick-access field as a self-configuring field featuring shortcuts with links to websites that are sorted and displayed by the frequency of the user's visits to these websites, and the user can also configure the quick-access field by manually selecting the websites that they wish to put in their quick-access field.

After installation, the web browser's initial quick-access field may be empty or pre-filled with links to the pre-defined websites that are offered to all new users, irrespective of a specific user's preferences. If the websites to be displayed in the quick-access field have been pre-defined in the browser's settings, each user would receive the identical initial quick-access field, which may turn out to be inconvenient or not relevant for the some or even the majority of users. For example, in the Opera browser, websites are fixed in the initial quick-access field, meaning that they will remain in the quick-access field, even if the user doesn't use them. An empty, or unfilled, quick-access field is also inconvenient, because it forces the user to fill it in on their own or wait until the quick-access field starts filling in automatically as the browser begins receiving data on the user's browsing history and interests.

For some web browsers, after the installation of the new web browser, the user can opt to configure the quick-access field in the web browser independently by adding links to websites manually. If the user has been using the web browser for some time, they can add URL links to websites to the quick-access panel from the list of visited websites, stored in the browser history, or from the bookmark library created in the process of web browser use. Upon the first installation of the web browser, the user can, of course, import their bookmark library, containing URL links to the stored websites from a previous web browser, into the newly-installed web browser. In this case, the user can augment the web browser's quick-access field with the same websites found in the imported bookmark library. In some web browsers, configuring the quick-access field with the use of imported bookmarks can be accomplished by the user manually, on the basis of the user personal preferences, or automatically.

It should be noted that some web browsers feature the option of configuring the quick-access field on the basis of user history.

Patent application US 2014/0108968, published on Apr. 17, 2014, discloses technology in which customized content is presented to user of a browser. A plurality of content items are determined and ranked for a user. The plurality of content items include user-specific content and general content. A tile is associated with each of the plurality of content items. The location of each tile is determined based on the rank of the content item associated with the tile. A layout is generated and transmitted together with the plurality of content items to the user browser for display.

Patent application US20140359424A1, published on Dec. 4, 2014, discloses a method for generating a web browser launch page is performed at a computer. The computer receives a user input to start a web browser application. In response to the user input, the computer identifies a set of favorite website addresses defined by the user and a set of website addresses visited by the user during a predefined time period and determines, among them, a set of favorite website addresses visited by the user during the predefined time period. For each favorite website address, the computer determines a timestamp of a most recent visit by the user, a number of visits by the user during the predefined time period, and a current score of the favorite website address and generates a new score for the favorite website address. Finally, the computer displays the set of favorite website addresses in a first window in an order consistent with their scores.

SUMMARY

Thus, the objective of the present technical solution is to eliminate at least some of the deficiencies of the prior art.

In the context of this description, unless provided otherwise, "server" means a computer program operating on the corresponding equipment, capable of receiving requests (such as from client devices) via the web and executing these requests or initiating their execution. Equipment may entail one physical computer or one physical computer system, but neither one is essential for this technical solution. In the context of this technical solution, use of the expression "server" does not mean that each task (such as received commands or requests) or any specific task will necessarily be received, executed or initiated for execution by one and the same server (i.e. by the same software and/or hardware); this means that any number of software elements or hardware elements can be involved in the reception/transmission, execution or execution initiation of any request or consequence of any request linked to the client device, and that all of the software and hardware may be a single server or several servers—both variants are encompassed by the expression "at least one server."

In the context of this description, unless provided otherwise, "client device" means hardware compatible with the software appropriate to solving the corresponding task. Thus, examples of client devices (inter alia) could be provided by personal computers (desktop computers, laptops, netbooks, etc.) smartphones, tablets, and network equipment such as routers, switches and gateways. It should be noted that, in this context, a device that behaves as a client device may act as a server with respect to other client devices. Use of the expression "client device" does not exclude the possible use of numerous client devices for the reception/sending, execution or execution initiation of any task or request, or the consequences of any task or request, or the stages of any of the aforementioned methods.

In the context of this description, unless provided otherwise, "database" means any structured data array—independent of the specific structure, software for database administration, and the hardware of the computer on which the data is stored, used or otherwise made available for use. The database may be found on the same equipment performing the process that saves or uses the information stored in the database, or it may be found on separate equipment, such as a dedicated server or set of servers.

In the context of this description, unless provided otherwise, "fixed machine-readable media" means media of absolutely any kind or nature, including RAM, ROM, disks (compact disks, DVD-disks, diskettes, hard disks, etc.), USB flash drives, solid-state drives, magnetic tape drives, etc.

In the context of this description, unless provided otherwise, the words "first", "second", "third", etc. are used as adjectives solely for the purposes of distinguishing between the nouns that they describe—not to imply a particular relationship between these nouns. Thus, for example, it should be noted that use of the terms "first server" and "third server" does not imply any particular order, classification as a particular type, chronology, hierarchy or ranking (for example) of servers/between servers, just as their use (in and of itself) does not imply that a certain "second server" must exist in a given situation. Hereinafter, as indicated here and in other contexts, reference to a "first" element and "second" element does not exclude the possibility that it is actually the same element. Thus, for example, in certain situations, the "first" server and "second" server may be one and the same software and/or hardware, and in other situations they may be different software and/or hardware.

The additional and/or alternate characteristics and advantages of the variants for implementing this technical solution will become evident from the following description, attached diagrams and attached invention formula.

BRIEF DESCRIPTION OF THE DRAWINGS

For the better understanding of the non-limiting embodiments of the present technology, a reference will be made to the following description, which should be used together with the attached drawings, in which:

FIG. 3 depicts an example of a table outlining the results of the computed first rank Rg1 for each website from the first set of websites.

DETAILED DESCRIPTION OF THE DRAWINGS

Figure 1:
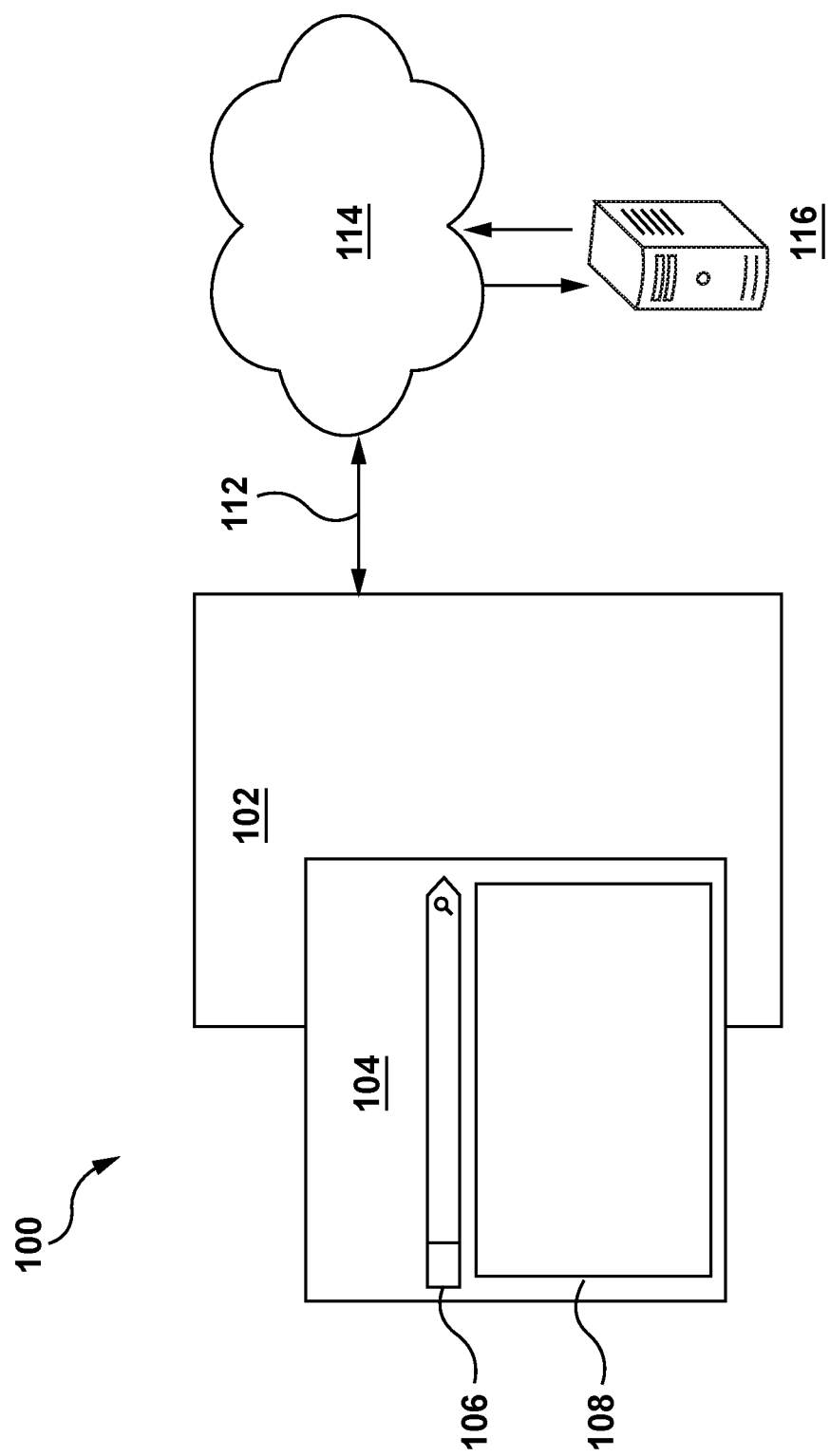
FIG. 1 depicts a schematic representation of a system, implemented according to non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

System 100 includes an electronic device 102. The electronic device 102 is associated with a user (not shown), and therefore may sometimes be referred to as the "client device". It should be noted that the fact that electronic device 102 is associated with the user does not assume or imply any particular mode of operation, such as the need to log in, need to be registered, etc.

The implementation of the electronic device 102 is not particularly limited, but as an example, the electronic device 102 may be implemented as a personal computer (desktop PC, laptop, tablet PC, etc.), a wireless electronic device (cellphone, smartphone, tablet, etc.), or network equipment (routers, switches and gateways). The general implementation of electronic device 102 is well known to those of skill in the art, and therefore will not be described here in detail. Suffice it to say, the electronic device 102 includes a user input interface (for example, microphone, keyboard, mouse, touch panel, touch screen, etc.) for receiving user input; a user output interface (such as, screen, touch screen, printer, etc.) for pfresenting visual or sound output to the user; a network communication interface (for example, modem, network card, etc.) for two-way communication via a data transmission network 114; and a processor, connected to the user input interface, user output interface and network communication interface, which is configured to execute various procedures, including those described below. To this end, the processor can store or gain access to machine-readable commands, which commands when executed by the processor cause the processor to implement various procedures described herein.

The electronic device 102 includes hardware and/or software and/or firmware (or a combination thereof) to execute a browser application 104. Generally speaking, the task of the browser application 104 is to provide the user (not shown) with access to one or more web resources. Browser application 104 features a command interface 106 and a browser interface 108; both depicted as empty, insofar as the user has not yet begun entering any web resource addresses or queries. the browser application 104 also features a quick-access field.

The electronic device 102 is connected to the data transmission network 114 via a data-transmission line 112. In certain embodiments of the present technology, the data transmission network 114 can be the Internet. In other non-limiting embodiments of the present technology, the data transmission network 114 can be implemented differently—in the form of a wide-area network, a local area network, a private network, etc.

The implementation of data-transmission line 112 is not limited, and depends on how the electronic device 102 is implemented. In those embodiments where the electronic device 102 is implemented as a laptop, the data-transmission line 112 can be either wireless (wireless Internet Wireless Fidelity, or WiFi® for short, Bluetooth® etc.) or wired (connection based on the Ethernet™).

It is important to note that the none-limiting embodiments described above for the implementation of electronic device 102, the data-transmission line 112 and the data transmission network 114 are given solely for illustrative purposes. Thus, other non-limiting embodiments for implementations of the electronic device 102, the data transmission line 112 and the data transmission network 114. That is, the examples presented here do not limit the scope of this technical solution.

Also coupled to the data-transmission network is a server 116. The server 116 can be implemented as a standard computer server. In a non-limiting embodiment of the present technology, the server 116 can be implemented as Dell™ PowerEdge™ server running on the Microsoft™ Windows Server™ operating system. Needless to say, the server 116 can be implemented in any other suitable hardware and/or applied software and/or firmware or a combination thereof. It is noted that in the depicted embodiment, the server 116 is a single server. In the other non-limiting embodiments of the present technology, the functionality of the server 116 can be distributed and can be implemented as multiple servers.

The various non-limiting embodiments of the present technology, the implementation of the server 116 is well known. Suffice it to state that the server 116 contains a communication interface (not shown), which is configured to establish a communication session with various other network entities (for example, the electronic device 102 and other devices, potentially connected to the data transmission network 114) via the data transmission network 114. The server 116 can additionally include one or more of: a computer processor (not shown) functionally connected to the communication interface, the computer processor being configured to execute the various processes described here.

In certain non-limiting embodiments of the present technology, the server 116 can be administered by the operator of a search engine, for example—by the operator of the search engine (Yandex™). In other non-limiting embodiments of the present technology, the server 116 can be administered by any other entity, such as the operator of another search engine, etc.

In other non-limiting embodiments of the present technology, the server 116 can be administered by the same entity providing the aforementioned browser application 104. In other non-limiting embodiments of the present technology, the server 116 can be administered by an entity other than the one providing the aforementioned browser application 104.

The implementation of browser application 104 is not specifically limited. For example, the browser application 104 can be implemented as the Yandex™ browser application within these non-limiting embodiments of the present technology, a navigation panel of the browser application 104 can sometimes be referred as the start page, which appears once the browser is launched or a new window or bookmark is opened in the browser application 104. The navigation panels, such as the start pages, usually differ from the "homepages" that the browser application 104 displays in response to a user click in on the "Home" button.

Figure 2:
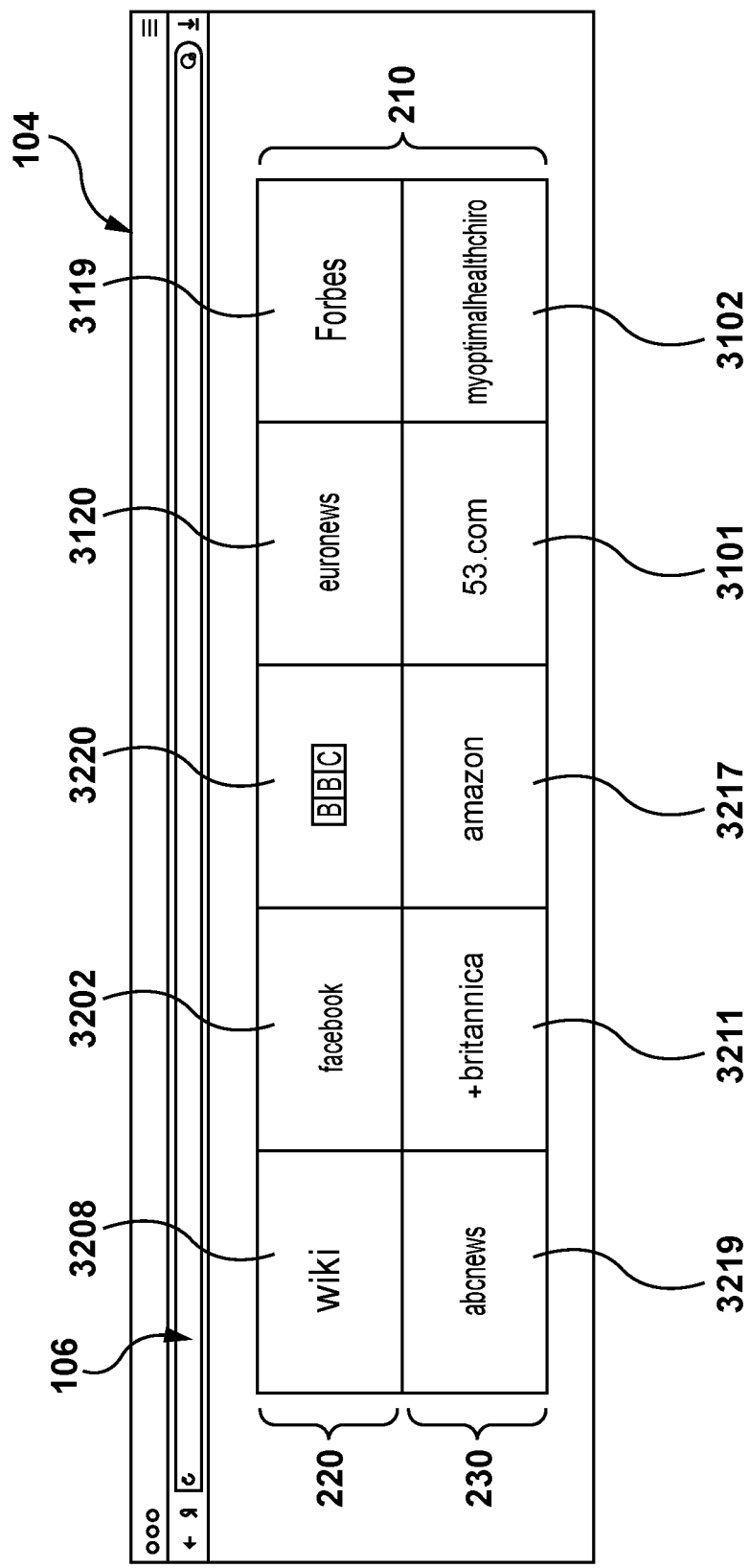
FIG. 2 depicts a screenshot illustrating a quick-access field of a web browser application implemented in accordance with a non-limiting embodiment of the present technology.

Embodiments of the present technology are based on a premise that upon the first installation of the browser application 104, the user can be presented with a quick-access field 210, as shown in FIG. 2, which could also be called the "visual-bookmark express-panel", which can be filled with URL links to the user-relevant websites upon the very first use of browser application 104. The start page, appearing upon the opening of the browser that has just been installed, opens a list of URL links to websites that may be relevant to the user; that said, the list of URL links is presented in a form of visual bookmarks.

FIG. 2 depicts a partial screenshot 200, showing the browser application 104, implemented according to the non-limiting embodiments of the present technology. In the non-limiting embodiments of the present technology depicted in FIG. 2, the screenshot 200 depicts the command interface 106 of the browser application 104, implemented as an omnibox, with the remaining part occupied by browser interface 108, containing the quick-access field 210. The quick-access field 210 contains visual bookmarks, namely URL inks to websites.

In non-limiting embodiments of the present technology, at least some visual bookmarks can be permanently fixed in the quick-access field 210 immediately after its generation and throughout the entire period of time during which the browser application 104 is running; and at least some visual bookmarks can be placed in the quick-access field 210 with the possibility of their deletion or replacement with the visual bookmarks of other websites, depending on their relevance to the user.

According to the non-limiting embodiments of the present technology, upon the first use of the browser application 104 after its installation, the user receives the quick-access field 110, which is filled with bookmarks relevant to the user, the bookmarks having been generated based on the geographic region of the user and the user's personal interests.

The specific implementation of the browser application 104 may vary without departing from the scope of the present technology. It's also important to not that the non-limiting embodiments of the present are not restricted to the specific browser environment illustrated in the partial screenshot 200 shown in FIG. 2.

In one non-limiting embodiments of the present technology, the electronic device 102 is configured to receive a request for installation of the browser application 104 (the request being originated by a user). The user, in turn, is associated with geographical data. The geographical data can include, but is not limited to, any data characterizing the geographical location of the user and/or the electronic device 102. In particular, the geographical data may include the permanent geographical location of the user and the geographical location of the user at the current moment; geographic position indicated by the user on social networks and blogs, or geographic position determined at least partially on the basis of information about the user's friends in social media.

In accordance with the non-limiting embodiments of the present technology, the geographical data received from the user's electronic device 102 may be used for selecting a website for the quick-access field. It is noted that the selection can be done on the electronic device 102 or the server 116.

In particular, the user's current location may be determined by the IP address the user uses to go online from their electronic device, or by the Global Positioning Service (GPS) coordinates of the user's electronic device 102, if no other information about the user is available. It should be noted that the embodiments of the present technology are not limited to GPS coordinates and may use other technique for determining geographical data different from GPS. In particular, the IP addresses of messages can be used to automatically extract the settings of such geographical parameters as city, country, continent, etc. A user location determined in this way can also be used as additional information about the user. For example, under the subsequent updating of bookmarks in the quick-access field.

In accordance with the non-limiting embodiments of the present technology, a geolocation API can be used, particularly but not so limited, when the user has authorized the determination of their location for sharing information about their location in web applications, which can be especially useful when the user's mobile electronic device is being used. In this case, determining location involves the use of all available and user-authorized devices and resources for determining location, including GPS coordinates, Wi-Fi network, cell tower data.

However, it should be noted that the geographical data (or geo-spatial data) is not limited to location information, but may also include: spatial relationships, time, descriptive information about spatial objects and imaging—for instance, the user may be flying in a plane, located underground, traveling by sea or by land. The user's geographical data can include, in addition or instead of, user's current geographical data, but also their habitual geographical data.

As has been alluded to above, the request for the installation of the browser application 104 can be originated by the user. In particular, the user may have decided to install the browser application 104 on their electronic device 102. As such, the electronic device 102 receives a request from the user for installation of the browser application 104—in particular, this could be a file initiating the installation of browser application 104.

In the considered non-limiting implementation variant, during the installation of browser application 104, the user's electronic device 102 has an IP-address that uniquely identifies the device for other network participants—in particular, for the server 116. More specifically, the electronic device 102 is a smartphone and has an IP address used for connecting to the Internet, on the basis of which the user's physical location is computed. However, this approach may turn out not to be sufficiently precise, insofar as the location may not be the exact location of the user and/or their electronic device, but merely the location of the user's Internet provider. Therefore, in the depicted embodiment, since the electronic device 102 is a smartphone with wireless access to the Internet, the nearest points of wireless access are determined as well. Moreover, in the depicted embodiment, the electronic device 102 is equipped with special GPS hardware, which makes it possible to determine the location of electronic device 102 with a precision of up to a few meters.

However, the use of GPS hardware alone also has its drawbacks, in particular—the significant power consumption of the electronic device 102, a smartphone, as well as in urban environments with tall buildings—the possibility of the signal bouncing off of several structures. It is also assumed that the user may enter their location manually, for example, by indicating their postal code or selecting their location on a map. The use of just one approach to determining the user's geographical data can have its own shortcomings, and in order to improve preciseness of the geographical data determination, a combined approach may be used to determine geographical data.

In the depicted non-limiting embodiment of the present technology, the electronic device 102 is configured to transmit to the server 116 the geographical data associated with the. Usually, the geographical data to associated with the user includes user location, i.e. the geolocation of user's electronic device 102, but may also encompass data on the user's other locations. Insofar as the user has authenticated themselves with the use of their electronic device, i.e. is using electronic device 102, it is assumed that the user and the device are found at that point in time at the same location. Moreover, it is also possible to factor in the geographical locations which the user frequents. Among other things, user authentication may be executed via Yandex.Passport™. The authentication of the user may include authentication of the user in their online account. The browser application 104 may be pre-installed on user's electronic device 102. User authentication may include authentication in the browser pre-installed on the electronic device 102. For example, this may be a social network account. Furthermore, as a result of authentication of the user, the electronic device 102 may receive a request for the installation of a web browser; that said, the request is linked to the user.

Thus, in the depicted non-limiting embodiment of the present technology, the server 116 received an indication of the current geographic position of user's electronic device 102, received via IP/GPS. Cookies can also be used for the extraction of the user's geographical data, including the permanent geographical location of user's electronic device 102. The browser application 104 has access to cookies. For example, certain websites specially store the user's geographical coordinates in cookies, if the user has set their web browser settings to allow the determination of their geographical location, insofar as this makes it simpler for websites to constantly track the location of individual website visitors. Cookies containing information about geographic position can be informative in terms of mapping the user's recent clickstream, and how frequently the user follows these clickstreams. This also makes it possible to determine which events of interest to the user may be taking place in the coming days in the geographical location associated with the user. It is also possible to use the user's browser history, formed as a result of the use of the previous browser.

In the depicted non-limiting embodiment of the present technology, both the cookies of the user and their GPS coordinates are used for the extraction of the following user geographical data: longitudinal and latitudinal coordinates, corresponding to Chicago, Ill. (USA), indicating that the user is likely located in Willis Tower. The user's geographical data is transmitted from the electronic device 102 to the server 116 via the data transmission line 112 for the purposes of receiving from the server 116 the first set of websites from the totality of websites; that said, the first set of websites being associated with the aforementioned geographical data.

Of course, the set of websites associated with the geographical data of the user includes, among other things, websites that are accessible from the established geographical location; that are operating in the established geographical location; that contain information on the established geographical data; that are frequented by users found in the established geographical location; that are holding events in the established geographical location; that report on events in the established geographical location; websites of international prominence reporting on events in the established geographical location. For websites with international footprint, the domain may change depending on the established geographical location, and can also change depending on the domain from which the users found in the established geographical location prefer to receive information.

Presented next is Table 1, containing, as an example, the first set of websites 310 associated with the aforementioned geographical data. In the depicted non-limiting embodiment of the present technology, the first set of websites 310 may include the websites 3101-3120 of organizations found in closest proximity to the exact geographical location of the user, i.e. in Willis Tower: website 3101 of Fifth Third Bank www.53.com, website 3102 of Optimal Health Chiropractic and Rehabilitation www.myoptimalhealthchiro.com, website 3103 of Metropolitan Club Business Center www.clubcorp.com, website 3104 of the hair salon A Cut Above http://acutabovechicago.com/, website 3105 of Barbara's Bestsellers www.barbarasbookstore.com, website 3106 of the restaurant French Accent http://frenchaccent.biz/, website 3107 of the cafe http://marketcreationscafe.com/, website 3108 of Starbucks Coffee http://www.starbucks.com/; as well as the websites of organizations operating in Chicago: website 3109 of the ballet studio Dance Classes Chicago www.izito.us, website 3110 of the University of Chicago www.uchicago.edu; and also the websites of organizations associated with transfers and accommodations in Chicago: website 3111 of Chicago Cheap Flights www.cheapoair.com, website 3112 of Lufthansa www.lufthansa.com, website 3113 of the Chicago transit system www.metrarail.com, website 3114 of the Chicago bus operator www.pacebus.com, website 3115 of Yellow Cab Chicago www.yellowcabchicago.com, website 3116 of Chicago housing rentals www.flatschicaho.com; and the websites of organizations holding events in Chicago: website 3117 of the Association for Behavior Analysis International www.abainternational.org, which is holding a conference in Chicago in 2016; and websites of international prominence reporting on events in Chicago: website 3118 www.timeout.com, website 3119 www.forbes.com, website 3120 www.euronews.com.

TABLE 1

| First set 310 | First rank Rg1 | Second rank Rh1 | Combined rank Rcom1 |
| --- | --- | --- | --- |
| www.53.com - 3101 | 7 | 10 | 17 |
| www.myoptimalhealthchiro.com - 3102 | 8 | 8 | 16 |
| www.clubcorp.com - 3103 | 6 | 6 | 12 |
| http://acutabovechicago.com/ - 3104 | 5 | 5 | 10 |
| www.barbarasbookstore.com - 3105 | 8 | 4 | 12 |
| http://frenchaccent.biz/ - 3106 | 6 | 3 | 9 |
| http://marketcreationscafe.com/ - 3107 | 4 | 3 | 7 |
| http://www.starbucks.com/ - 3108 | 10 | 4 | 14 |
| www.izito.us - 3109 | 5 | 6 | 11 |
| www.uchicago.edu - 3110 | 6 | 4 | 10 |
| www.cheapoair.com - 3111 | 4 | 3 | 7 |
| www.lufthansa.com - 3112 | 7 | 7 | 14 |
| www.metrarail.com - 3113 | 4 | 6 | 10 |
| www.pacebus.com - 3114 | 3 | 5 | 8 |
| www.yellowcabchicago.com - 3115 | 3 | 9 | 12 |
| www.flatschicaho.com - 3116 | 7 | 4 | 11 |
| www.abainternational.org - 3117 | 8 | 3 | 11 |
| www.timeout.com - 3118 | 5 | 5 | 10 |
| www.forbes.com - 3119 | 10 | 9 | 19 |
| www.euronews.com - 3120 | 10 | 10 | 20 |

Of course, the listed websites are only presented for the purposes of illustration and in no way represent an exhaustive list of the websites that could be used for the implementation of the non-limiting embodiments of the present technology. Clearly, websites reflecting operations in the established geographical location may relate to a broader geographical location—to a country or even to the entire world.

Thus, the electronic device 102 receives the first set 310 of websites associated with the aforementioned geographical data from the server 116. Moreover, the electronic device 102 receives from the server 116 the first rank Rg1, computed for each website 3101-3120 from the first set 310 of websites. Computation of first rank Rg1 for each website 3101-3120 from the first set 310 of websites based on the popularity of the given website among at least some of the users associated with the aforementioned geographical data.

It should be noted that in those embodiments where the implementation of this method is on the server 116, the first set 310 of websites is created on the basis of the geographical data received by the server 116 from the electronic device 102, and in the event of implementation of this method on the electronic device 102, the first set 310 of websites is transmitted to the electronic device 102 from the server 116, where the first rank for each such website from the set of websites is computed, and then the computed first rank is transmitted to the electronic device 102.

Table 1 in FIG. 3 provides an example of the results of the computed first rank Rg1 for each website 3101-3120 from the first set 310 of websites.

The users associated with the mentioned geographical data could be users who are primarily found or live permanently in the established geographical location; they visit websites reflecting operations in the established geographical location, but are not limited to this. In the depicted non-limiting embodiment of the present technology, the computation of first rank Rg1 for each website 3101-3120 is based on the popularity of the given website among at least some of the users linked to Chicago, Ill., the USA—in particular, on the basis of the popularity of that website among at least some of the users linked to Willis Tower in Chicago. Of course, it is possible to group users according to the criterion of distance from the specific coordinates of the user. For example, from the users working at Willis Tower—100% of the users can be selected; from the users primarily found in Chicago, 60% of the users can be selected. Additionally, it is possible to select a certain number of users who frequent Chicago—for example, from 10% to 15% of such users. Furthermore, it is possible to select users who are registered, studying—whether remotely or periodically—have family, business, social or other ties to the established geographic position, etc.

In the depicted non-limiting embodiment of the present technology, the first rank Rg1 is computed for each website 3101-3120 from the first set 310 of websites. Under the computation of the aforementioned first rank of the specified website from the first set of websites based on the popularity of that website among at least some of the users linked to the aforementioned geographical data, the following parameters are used, in particular: frequency of visits, time spent on the website, activity of the use of navigation elements, full viewing of content, duration of content viewing, number of clicks, number of links or a combination thereof.

For example, determining popularity can be based on behavioral user indicators, which include the "clickability" parameter for a particular page or website—the number of clicks on a particular page or website, where the number of clicks is an indication of user interaction; the parameter of visit frequency, indicating the number of user returns to the same website; time spent on the website; and the parameter of the number of comments made on an article or post may also be used. Another parameter that can be used is the number of users, the websites of which have been bookmarked from the first set of websites; some browsers relay their user data to services that perform user-behavior analytics, such as Google Analytics™, Yandex.Metrica™. The number of rejects, i.e. the number of times users leave a website within the first minutes of visiting it can also be one of the parameters for ranking popularity.

As another example, parameters for ranking popularity can be chosen depending on the established geographical location; on the classification of the given website—for instance, for an online store, the parameter for ranking popularity could be the number of purchases made by users, while for a news website linked to the geographical location, the parameter for ranking popularity could be the extent of the users' viewing of content on that website.

The electronic device 102 transmits browser history data associated with the user to the server 116. The browser history data includes the history of visited pages, the history of downloaded files, the user's online activity, search logs, etc., that are locally stored on the electronic device 102 and can be extracted and transmitted to the server 116.

Prior to installing the browser application 104, the user may have already used another browser application and browser history data may be stored on electronic device 102—even after deletion of the previous web browser application. Moreover, at least some of the browser history data may be stored in cookies, which contain information regarding the start and end of the user's website-viewing session, the number and duration of the user's previous visits—in other words, browser history data may also include data on the user's behavior on the website.

If the electronic device 102 has stored at least some of the cookies and/or history of visiting websites, the stored information may be sufficient for the extraction of additional user behavior analytical data from the services performing analytics on user behavior. Analysis of user behavior may also include the user's behavior on social media and their number of friends on social networks. The user's browser history data locally stored on the electronic device 102 and additionally extracted from analytical services may be used for the further extraction of ranking parameters. The parameters for ranking a website on the basis of browser history data may be as follows: frequency of the user's visits, intensity of the use of navigation elements, full viewing of content, duration of content viewing, clickstream through pages, completed purchases, orders, comments, feedback, posts, statements, etc. It should be noted that user behavior analytical data can be kept on the server 116 and then relayed to the electronic device 102. Thus, both the user's electronic device 102 and the server 116 contain user behavior analytical data.

Insofar as this method can be implemented both on the electronic device 102 and on the server 116, it is important to note that if the electronic device 102 lacks the data required for the implementation of this method on the electronic device 102, then this data can be received from the server 116 and vice versa. For example, under the implementation of this method on the electronic device 102, it may be useful to have the additional transmission of user-history data, which may be received on the electronic device 102 via the server 116 from services performing the analysis of user behavior. At the same time, under the implementation of this method on the server 116, utility may be provided by the user-history data received from the electronic device 102, in addition to the user history data found on the server thanks to the services performing user behavior analytics.

Additionally, before the extraction of browser history data associated with the user, it is possible to execute the transfer from the electronic device 102 to the server 116 a request for additional browser history data linked to the user, or the transmission to the server 116 of a request for a profile of the user behavior linked to the user, based on the browser history data linked to the user.

The browser history data associated with the user may be extracted during installation of the browser application 104, if the user has already used the browser application previously found on the electronic device 102; or during the first authentication of the user in the browser application 104, if the user has not yet used the web browser application previously found on electronic device 102.

Accordingly, if the user has a profile that can be used to extract the user's browser history, which may be stored on the server 116 and used under the implementation of this method on the server 1116, or be relayed from the server 116 to the electronic device 102 under the implementation of this method on the electronic device 102. For example, if the user has an account on the service Yandex.Passport™, which supports the ability to perform authorization in just one of the Yandex™ services, in order to gain simultaneous access to all Yandex™ services, including services performing user behavior analytics, such as Yandex.Metrica™. For instance, Yandex.Passport™ makes it possible to add several profiles to the existing account, consequently, it is possible to add more than one user to the account on Yandex.Passport.

On the basis of the browser history data associated the user, a second set 320 of websites is created, as shown in Table 2. In the depicted non-limiting embodiment of the present technology, the second set 320 of websites may include the websites 3201-3220 of the social networking sites www.facebook.com, www.twitter.com, www.pinterest.com; the food-and-grocery delivery service www.chicago.eat24 hours.com, www.petfoodzoom.com, the popular-science, directory and dictionary websites www.kidssciencelab.com, www.wikipedia.org, www.merriam-webster.com, www.thefreedictionary.com, www.britannica.com, www.nature.com, www.psychology.okstate.edu, www.alz.org, www.worldobesity.org, www.human-memory.net; the online stores www.amazon.com, www.ebay.com; and the news websites www.nbcnews.com, www.bbc.co.uk.

TABLE 2

| Second set - 320 | First rank Rg2 | Second rank Rh2 | Combined rank Rcom2 |
|---|---|---|---|
| www.facebook.com - 3202 | 10 | 10 | 20 |
| www.twitter.com - 3203 | 8 | 4 | 12 |
| www.pinterest.com - 3204 | 8 | 3 | 11 |
| www.chicago.eat24hours.com - 3205 | 7 | 4 | 11 |
| www.petfoodzoom.com - 3206 | 5 | 7 | 12 |
| www.kidssciencelab.com - 3207 | 4 | 7 | 11 |
| www.wikipedia.org - 3208 | 10 | 10 | 20 |
| www.merriam-webster.com - 3209 | 4 | 10 | 14 |
| www.thefreedictionary.com - 3210 | 5 | 9 | 14 |
| www.britannica.com - 3211 | 7 | 10 | 17 |
| www.nature.com - 3212 | 4 | 6 | 10 |
| www.psychology.okstate.edu -3213 | 6 | 7 | 13 |
| www.alz.org -3214 | 2 | 8 | 10 |
| www.worldobesity.org - 3215 | 3 | 10 | 13 |
| www.human-memory.net -3216 | 3 | 10 | 13 |
| www.amazon.com - 3217 | 10 | 6 | 16 |
| www.ebay.com - 3218 | 10 | 4 | 14 |
| www.nbcnews.com - 3219 | 9 | 8 | 17 |
| www.bbc.co.uk - 3220 | 9 | 10 | 19 |

Of course, the listed websites are only presented for the purposes of illustration and in no way represent an exhaustive list of the websites that could be used for the implementation of the non-limiting embodiments of the present technology. In the depicted non-limiting embodiment of the present technology, the first set 310 of websites and second set 320 of websites do not intersect; that is, there is no common website that would be found in both first set 310 of websites and second set 320 of websites. However, this does not exclude the possibility of such intersection in other non-limiting embodiment of the present technology.

Thereafter, the electronic device 102 receives from the server 116 at least one parameter associated with the popularity of each website from the second set 320 of websites among at least some of the users linked to the established geographical data. The parameters for ranking websites by popularity is explored in detail herein below with respect to the ranking of the first set 310 of websites.

The computation of second rank Rh1 on the electronic device 102 is executed for each website 3101-3121 from the first set 310 of websites. It should be noted that the electronic device 102 already has access to the locally stored browser history data of the user, as well as possible additional user behavior analytical data, yielded from the user profile obtained from analytical services. Consequently, the aforementioned user data, as was already mentioned earlier in the text, may be used as ranking parameters for the computation of second rank Rh1 of each website 3101-3121 from the first set 310 of websites, as indicated in Table 1.

Since the second set 320 of websites 3201-3221 has already been created on the basis of browser history data, computation of the first and second rank for the second set 320 of websites can be executed on the electronic device 102. First rank Rg2 is computed on electronic device 102 for each website 3201-3221 from the second set 320 of websites with the use of at least one parameter associated with popularity.

Thus, the first rank Rg1 denotes the first rank for the first set 310 of websites, computed on the basis of popularity, and first rank Rg2 denotes the first rank for the second set 320 of websites, also computed on the basis of popularity. It is worth noting that the first set 310 of websites is associated with the determined geographical data with which the user is associated, and the second set 320 of websites is created on the basis of the browser history data associated with the user.

Second rank Rg2 is computed on the electronic device 102 for each website 3201-3221 from the second set 320 of websites with the use of at least one parameter extracted from browser history data. Examples of such parameters have been provided above.

In the depicted non-limiting embodiment of the present technology, the electronic device 102 executes computation of the combined rank Rcom for each website 3101-3120 from the first set 310 of websites and for each website 3201-3220 from the second set 320 of websites, as shown in the table in FIG. 3. In the depicted non-limiting embodiment of the present technology, the combined rank Rcom1 is the sum of the computed first rank Rg1 for each website 3101-3120 from the first set 310 of websites and second rank Rh1 for each website 3101-3120 from the first set 310 of websites; and combined rank Rcom2 is the sum of the computed first rank Rg2 for each website 3201-3220 from the second set 320 of websites and second rank Rh2 for each website 3201-3220 from the second set 320 of websites.

In the depicted non-limiting embodiment of the present technology, the combined rank Rcom1 for the first set 310 of websites is computed as Rcom1=Rg1+Rh1, combined rank Rcom2 for the second set 320 of websites is computed as Rcom2=Rg2+Rh2.

It is worth noting that other non-limiting embodiments are possible for executing of the computation of combined rank Rcom for each website from the first set of websites and for each website from the second set of websites.

In the depicted non-limiting embodiment of the present technology, the first threshold value T1 and second threshold value T2 have been set on the electronic device 102. It should be noted that the first and second threshold values T1, T2 may be established as a threshold amount corresponding to a webpage rank whereby the URL link to that webpage is positioned as a visual bookmark in quick-access field 210. In the depicted non-limiting embodiment of the present technology, the first threshold value T1 is a threshold that allows for the placement of the URL link to a website in quick-access field 210, if the combined rank of that website is higher or equal to the first threshold value T1.

In the depicted non-limiting embodiment of the present technology, T1=15, while T2=18.

As depicted in FIG. 2, the quick-access field 210 can be divided into two parts, one of which is the fixed part 220 in which bookmarks are set, i.e. remain constant throughout the entire period of use of the browser application 104; and the other of which is the variable part 230, in which bookmarks are not set, i.e. can be deleted or replaced with bookmarks with URL links to other websites.

In the depicted non-limiting embodiment of the present technology, these bookmarks can be set in quick-access field 210 depending on the size of the rank, as shown in FIG. 2. The most relevant visual bookmarks are set in the fixed part 220 of quick-access field 210, while the un-set websites are presented in the variable part 230 of quick-access field 210.

In the depicted non-limiting embodiment of the present technology, the second threshold value T2 is a threshold that allows for the placement of the URL link to a website in the form of a bookmark in quick-access field 210, and if the combined rank Rcom of that website is higher or equal to the second threshold value T2, then the link to that website can be presented in the fixed part 220 of quick-access field 210.

Since the selection has been made of a second threshold value T2 that exceeds first threshold value T1, i.e. T2>T1, the websites with the highest rank can be isolated, and the most user-relevant URL links to these websites can therefore be placed in the fixed part 220 of quick-access field 210.

If the combined rank Rcom of this website is within the interval between the first threshold value T1 and second threshold value T2 or equal thereto, the URL link to that website can be presented in the variable part 230 of quick-access field 210. In the depicted non-limiting embodiment of the present technology, T1=15 and T2=18, the websites exceeding T2 are presented in quick-access field 210. As is depicted in FIG. 2, the quick-access field 210 presents the websites www.wikipedia.org 3208, www.facebook.com 3202, www.bbc.co.uk 3220, www.euronews.com 3120, www.forbes.com 3119, www.nbcnews.com 3219, www.britannica.com 3211, www.amazon.com 3217, www.53.com 3101, www.myoptimalhealthchiro.com 3102. Websites with a combined rank Rcom exceeding second threshold value T2 are presented in fixed part 220 of quick-access field 210: www.wikipedia.org 3208, www.facebook.com 3202, www.bbc.co.uk 3220, www.euronews.com 3120, www.forbes.com 3119. Websites with a combined rank Rcom less than second threshold value T2 are presented in variable part 230 of quick-access field 210: www.nbcnews.com 3219, www.britannica.com 3211, www.amazon.com 3217, www.53.com 3101, www.myoptimalhealthchiro.com 3102.

It should be noted that other implementation are possible for the computation of combined rank Rcom on the basis of computed first rank Rg1, computed second rank Rh1 for each such website from the first set of websites, computed first rank Rg2 and computed second rank Rh2 for each such website from the second set of websites.

Thus, if second rank Rh of the given website from the first set 320 of websites or second set 330 of websites is greater than the second threshold value T2, that website is labeled for addition to the fixed part 220 of quick-access field 210; if second rank Rh of the given website from the first set 320 of websites or second set 330 of websites is lesser than second threshold value T2, that website is labeled for addition to the variable part 230 of quick-access field 210.

In the depicted non-limiting embodiment of the present technology, the executed method also includes tracking, within a pre-determined interval of time, of the user's browser history data. The tracking of the browser history data can be useful for maintaining the relevance of bookmarks in the quick-access field. When the user begins using the browser application 104, the quick-access field 210 has already been generated on the basis of the data that was already on the user's electronic device 102 at the time of installation of browser application 104.

Thus, the user's geographical data and the user's browser history data can be received from the device. At the same time, additional browser history data on the user can be obtained, in particular from analytical services such as Google Analytics and Yandex.Metrica™. This additional data can be obtained if the device has retained any log-files containing information on the user's account in these systems. Thus, on the basis of this data, the service can form a user profile that reflects user behavior. As the user begins using browser application 104, the user can start changing their preferences with respect to websites. For example, over time, some of the bookmarks for the websites found in the quick-access field may turn out to be irrelevant to the user by virtue of the fact that the user no longer visits these websites, or that over a span of time the user has stopped using the services of a particular bank and started using the services of another bank.

For the purposes of tracking the user relevance of the bookmarks in quick-access field 210, it's preferable to track browser history data and user behavior profile over the pre-determined time interval. If this tracking reveals changes in browser history data and/or user behavior, this can be reflected in quick-access field 210, in particular, in the variable part 230 of quick-access field 210. The time interval may be set as identical for all websites, but can also be set depending on the user's frequency of visiting that website, or depending on any other appropriate parameter.

It should be understood that the tracking of established geographical data is also possible. For example, if the user changes their place of residence once every six months, this can affect the relevance of the bookmarks in the variable part 230 of quick-access field 210. On the other hand, it should be understood that according to this technical solution, the presence in quick-access field 210 of fixed part 220 and variable part 230 is preferable but not essential. In this technical solution, the technical result is also achieved without the division of quick-access field 210 into fixed part 220 and variable part 230.

If the combined rank Rcom of that website declines within the pre-determined time interval, then it makes sense to delete the bookmark with the URL link to that website from quick-access field 210. The following is mostly relevant to those embodiments in which there is no combination of fixed part 220 and variable part 230 in the quick-access field 210. The tracking within the pre-determined time interval of geographical data, browser history data and user history data also makes it possible to add new websites to the first rank 310 of websites for the computation of first rank Rg1 and second rank Rh1, and to add new websites to the second set 320 of websites for the computation of first rank Rg2 and second rank Rh2. If the combined rank Rcom for the given new website, computed on the basis of first rank Rg1 and second rank Rh1 from the first set 310 of websites and combined rank Rcom for the given new website, computed on the basis of first rank Rg2 and second rank Rh2 from the second set of websites 320, exceeds the combined rank of another website, then it is possible to add this new website to the quick-access field 210 in fixed part 220 or variable part 230, depending on the size of the combined rank Rcom of that website.

The browser history data and user behavior data may not only have a direct relationship to the user, but may also be linked to the user in another way, as described in detail earlier in the text of this application.

Geographical data, browser history data and user behavior data can be tracked throughout the entire period of time during which browser application 104 is installed on the electronic device. The intermittency of the computation of ranks for each website from the first and second sets of websites, as well as the computation of ranks for new websites received from browser history and user behavior profile can be selected such that quick-access field 210 maintains its currency and relevance for the user. Among other things, the browser history data and user behavior profile, tracked throughout the established period of time, can themselves be used for selection of the intermittency with which the aforementioned ranks should be computed.

In the depicted non-limiting embodiment of the present technology, the quick-access field 210 has fixed part 220 and variable part 230, it's appropriate to track browser history data and user behavior data. In this implementation variant, it is possible to have the periodic computation of second rank Rh1 of the websites from first set 310 of websites and second rank Rh2 of the websites from second set 320 of websites. In the depicted non-limiting embodiment of the present technology, the tracking within the pre-determined time interval of browser history data and user behavior data also makes it possible to add new websites to the first rank 310 of websites for the computation of second rank Rh1, and to add new websites to the second set 320 of websites for the computation of second rank Rh2. If second rank Rh1 for the given new website from the first set 310 of websites and second rank Rh2 for the given new website from the second set 320 of websites exceeds the second rank Rh1 of another website already found in quick-access field 210 from the first set 310 of websites, and the second rank Rh2 of another website already found in quick-access field 210 from the second set 320 of websites, then it is possible to add this new website to quick-access field 210. It should be understood that in this case that the second rank will be greater than the second threshold value T2.

Moreover, if, among the websites from the first set 220 of websites or the second set 230 of websites with the identical combined rank Rcom or with the identical second rank Rh1, Rh2, there are commercial websites whose proprietors are paying for placement in quick-access field 210, then in this case, it is possible to use additional ranking parameters, such as the stability of website functioning, the website's design and convenience of use, the level of visitor servicing, i.e. its range of goods and services, whether the website supports making a purchase/obtaining services or just recommends particular products. The nuances of evaluating the quality of a particular commercial website are well known to specialists in this technical field. Thus, commercial relevance may also be used for the creation of quick-access field 210. It should be understood that, for certain purposes, ranking by commercial relevance may be preferable to ranking by thematic relevance, i.e. if commercial and non-commercial websites have the identical combined rank Rcom or the identical second rank Rh1, Rh2, these commercial websites may be preferable for placement in the quick-access field compared to commercial websites.

In the depicted non-limiting embodiment of the present technology, the user can select the number of visual bookmarks by the width and height of browser interface 108 in order to achieve the filling of quick-access field 110 that is most convenient for the user.

In other non-limiting embodiment of the present technology, the user can independently regulate the distribution of visual bookmarks by category, rearrange the visual bookmarks relative to one another.

In other non-limiting embodiment of the present technology, the server 116 can receive from electronic device 102 the browser history data linked to the user and on the basis of this data create the second set 320 of websites with the subsequent computation of the first rank and second rank for each such website from the first set of websites, with the computation of the first rank and second rank for each such website from the second set of websites, and with the computation of combined rank based on the computed first and second rank for each such website from the first set 310 of websites and the second set 320 of websites. In the depicted non-limiting embodiment of the present technology, the server 116 is executed with the capability of relaying to electronic device 102 an array of websites from the first set 310 of websites and second set 320 of websites, whose combined rank is greater than the first threshold value.

Figure 4:
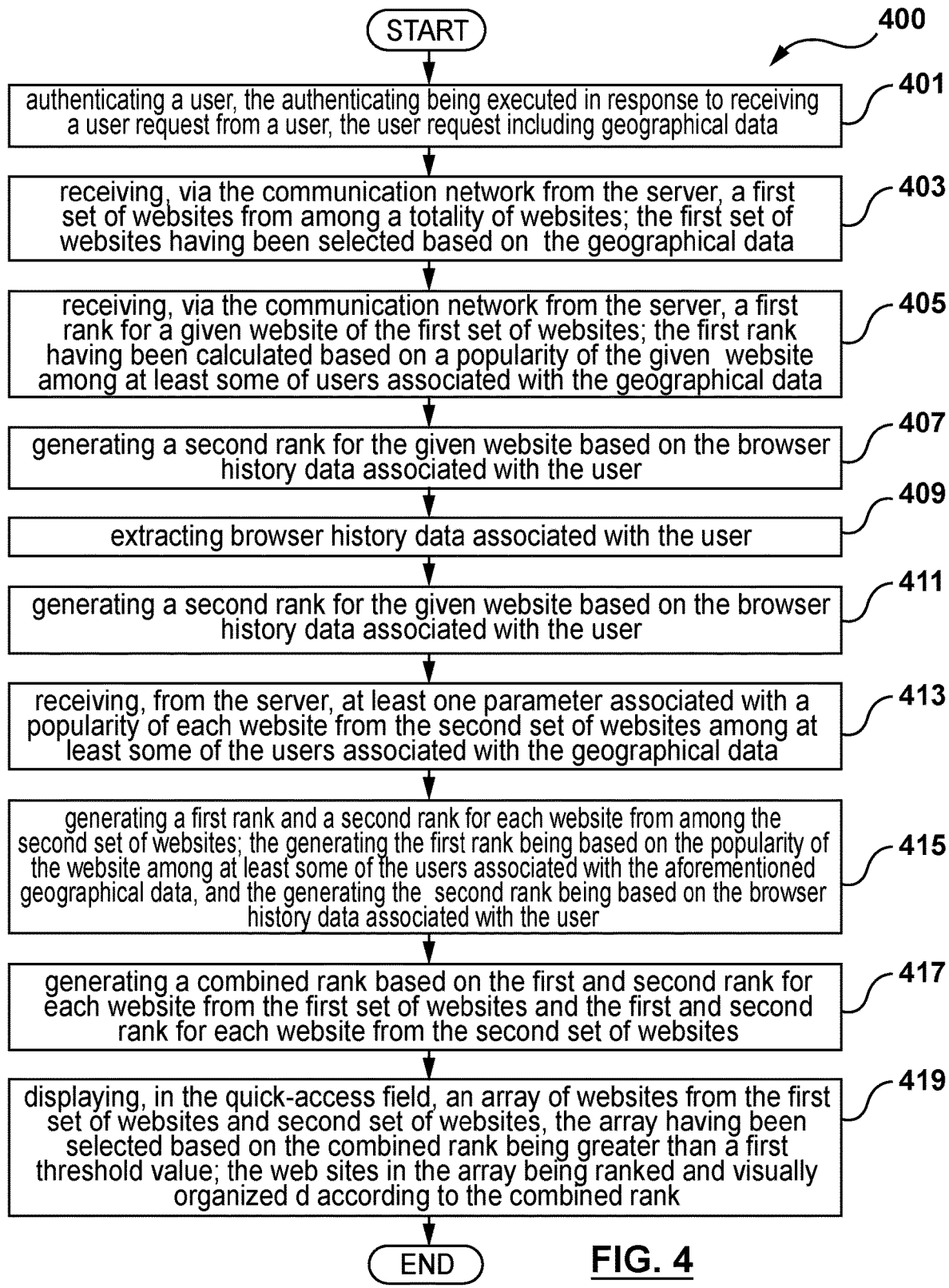
FIG. 4 depicts a flowchart of a method implemented on an electronic device of the system of FIG. 1, the method implemented in accordance with the non-limiting embodiments of the present technology.

In view of the foregoing, with reference to the architecture of system 100 presented in FIG. 1, and the examples provided with reference to FIG. 2 and FIG. 3, a method may be implemented for the selection of websites for the quick-access field in the web browser. FIG. 4 depicts a flowchart of the method for selecting the quick-access field in the web browser, implemented on electronic device 102 within the scope of system 100 according to the unlimited variants for the implementation of this technical solution. In method 400, the electronic device 102 is executed with the capability of connection via the communication network to server 116.

Step 401—authenticating a user, the authenticating being executed in response to receiving a user request from a user, the user request including geographical data Method 400 starts at step 401 with electronic device 102 receiving a request for the installation of the browser application 104; that said, this request is associated with the user, and the user is associated with geographical data. The concept "geographical data" and what it encompasses is explored in great detail above. The request for installation of browser application 104 could be, for example, the opening and subsequent launch of the setup file for the installation of browser application 104.

Then, method 400 proceeds to the execution of step 403.

Step 403—receiving, via the communication network from the server, a first set of websites from among a totality of websites; the first set of websites having been selected based on the geographical data;

At step 403, after the installation of browser application 104, the electronic device 102 receives from the server 116, via the data transmission network 114, the first set 310 of websites from among the totality of websites; that said, the first set 310 of websites being associated with the aforementioned geographical data.

As was described in connection with FIG. 3, the first set 310 of websites can include the websites 3101-3120 of organizations located in closest proximity to the precise geographical location of the user. Thus, the electronic device holds the first set 310 of websites 3101-3120.

Then, method 400 proceeds to the execution of step 405.

Step 405—receiving, via the communication network from the server, a first rank for a given website of the first set of websites; the first rank having been calculated based on a popularity of the given website among at least some of users associated with the geographical data At step 405, the electronic device 102 receives from the server 116 the computed first rank Rg1 for each such website 3101-3120 from the first set 310 of websites; the values of computed first rank Rg1 are presented in FIG. 3.

Then, method 400 proceeds to the execution of step 407.

Step 407—generating a second rank for the given website based on the browser history data associated with the user;

Insofar as the first set 310 of websites is received at step 403, and the computed first rank Rg1 for each such website 3101-3120 from the first set 310 of websites was already received at step 405, step 407 involves the computation of second rank Rh1 for each such website 3101-3120 from the first set 310 of websites. The parameters for the computation of second rank Rh1 are found on the electronic device 102.

Step 409—extracting browser history data associated with the user;

At step 409, the electronic device 102 extracts browser history data linked to the user from the files stored on the user's electronic device 102.

Then, method 400 proceeds to the execution of step 411.

Step 411—creating a second set of websites based on the browser history data

At step 411, the browser history associated with the user is used for the creation of the second set 320 of websites 3201-3220.

Then, method 400 proceeds to the execution of step 413.

Step 413—receiving, from the server, at least one parameter associated with a popularity of each website from the second set of websites among at least some of the users associated with the geographical data Insofar as the electronic device 102 lacks parameters for the ranking of the second set of websites 320 by popularity, at step 413, the electronic device 102 receives from the server 116 the parameters by which the websites in the second set of websites can be ranked according to popularity.

Then, method 400 proceeds to the execution of step 415.

Step 415—generating a first rank and a second rank for each website from among the second set of websites; the generating the first rank being based on the popularity of the website among at least some of the users associated with the aforementioned geographical data, and the generating the second rank being based on the browser history data associated with the user;

At step 415, the electronic device 102 generates the first rank Rg2 and second rank Rh2 for the second set 320 of websites. At step 415, the electronic device 102 already has the parameters for the computation of first rank Rg2 and second rank Rh2 for each such website 3201-3221 from the second set 320 of websites. The parameters for the computation of second rank Rg2 were received at stage 411, and the parameters for the computation of second rank Rh2 are found on electronic device 102. The browser history data extracted at stage 405 can then be used as parameters for the ranking of websites 3201-3220 in the second set 320 of websites.

Then, method 400 proceeds to the execution of step 417.

Stage 417—generating a combined rank based on the first and second rank for each website from the first set of websites and the first and second rank for each website from the second set of websites;

At step 417, the electronic device 102 generates combined rank Rcom for each website 3101-3121 from the first set 310 of websites and for each website 3201-3221 from the second set 320 of websites, as shown in the table in FIG. 3.

In the depicted non-limiting embodiments of the present technology, the combined rank Rcom1 is the sum of the computed first rank Rg1 for each website 3101-3121 from the first set 310 of websites and second rank Rh1 for each website 3101-3121 from the first set 310 of websites; and combined rank Rcom2 is the sum of the computed first rank Rg2 for each website 3201-3221 from the second set 320 of websites and second rank Rh2 for each website 3201-3221 from the second set 320 of websites.

In the depicted non-limiting embodiments of the present technology, combined rank Rcom1 for the first set 310 of websites is computed as Rcom1=Rg1+Rh1, combined rank Rcom2 for the second set 320 of websites is computed as Rcom2=Rg2+Rh2.

Then, method 400 proceeds to the execution of step 419.

Stage 419—displaying, in the quick-access field, an array of websites from the first set of websites and second set of websites, the array having been selected based on the combined rank being greater than a first threshold value; the web sites in the array being ranked and visually organized d according to the combined rank The electronic device 102 has access to the first threshold value T1. The first threshold value T1 may be established as a threshold amount corresponding to a webpage rank whereby the URL link to that webpage is positioned as a visual bookmark in quick-access field 210 In the depicted non-limiting embodiments of the present technology, the first threshold value T1 is a threshold that allows for the placement of the URL link to a website in quick-access field 210, if the combined rank of that website is higher or equal to the first threshold value T1. Step 419 involves the presentation to the user, on the display of electronic device 102, of an array of websites 3101-3120 from the first set 310 of websites and an array of websites 3201-3221 from the second set 320 of websites, as depicted in FIG. 2.

Figure 5:
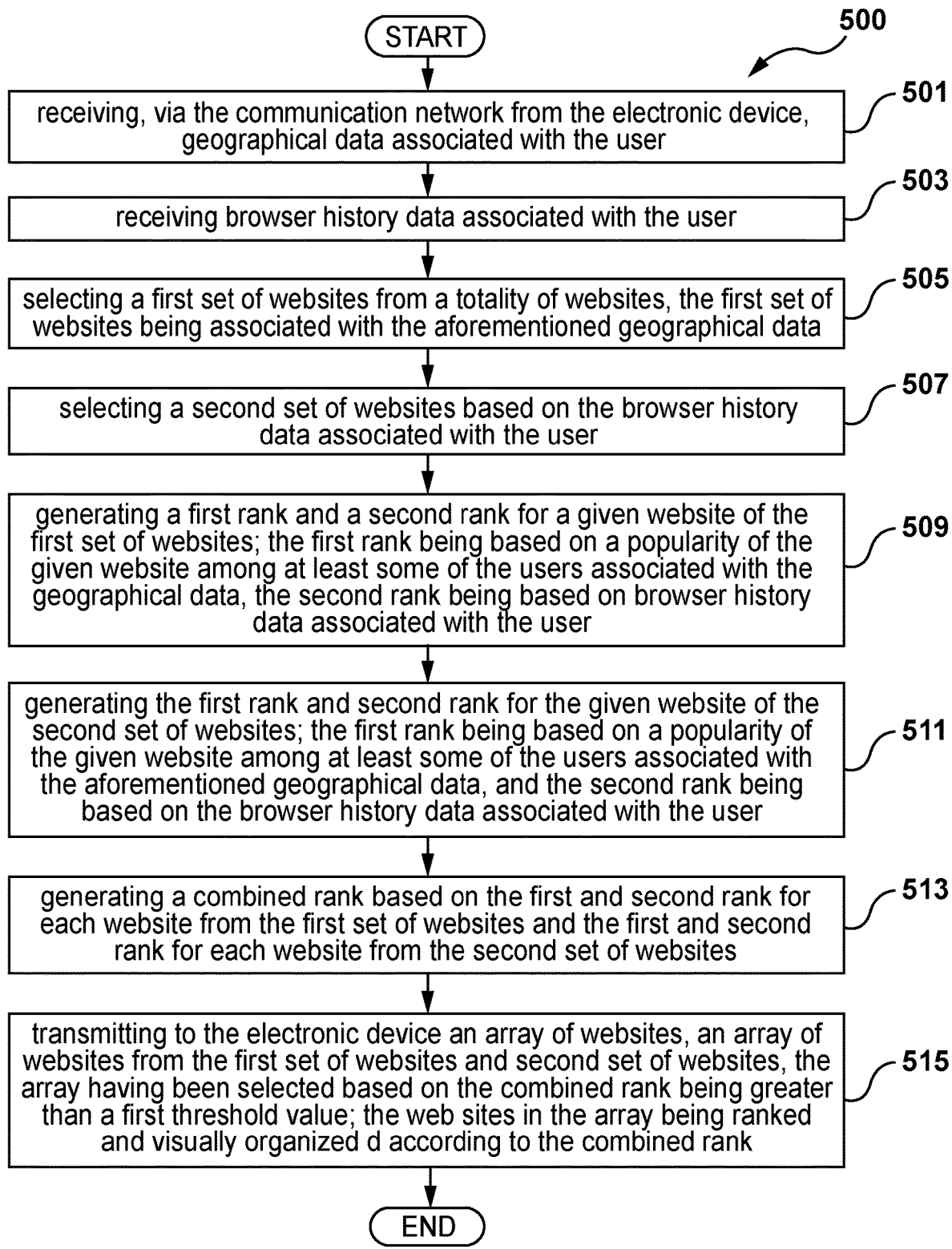
FIG. 5 depicts a flowchart of a method implemented on the electronic device of the system of FIG. 1, the method implemented in accordance with other non-limiting embodiments of the present technology.

In view of the foregoing, with reference to the architecture of system 100 presented in FIG. 1, and the examples provided with reference to FIG. 2 and FIG. 3, a method may be implemented for the selection of websites for the quick-access field in the web browser. FIG. 5 depicts a flowchart of the method for selecting the quick-access field in the web browser, implemented on server 116 within the scope of system 100 according to the non-limiting variants for the implementation of this technical solution. In method 500, the electronic device 102 is executed with the capability of connection via the communication network to server 116.

Step 501—receiving, via the communication network from the electronic device, geographical data associated with the user Method 500 begins at step 501 with the reception by the server 116 from the electronic device 102, via the communication network, of geographical data linked to the user.

Then, method 500 proceeds to the execution of step 503.

Step 503—receiving browser history data associated with the user

At step 503, the server 116 receives browser history data from electronic device 102.

Then, method 500 proceeds to the execution of step 505.

Step 505—selecting a first set of websites from a totality of websites, the first set of websites being associated with the aforementioned geographical data Server 116 has access to the totality of websites. Thus, the server 116 is configured to select from this totality of websites in the first set 310 of websites linked to the aforementioned geographical data.

Then, method 500 proceeds to the execution of step 507.

Step 507—selecting a second set of websites based on the browser history data associated with the user At step 507, the server 116 selects a second set 320 of websites based on browser history data linked to the user.

Then, method 500 proceeds to the execution of step 509.

Step 509—generating a first rank and a second rank for a given website of the first set of websites; the first rank being based on a popularity of the given website among at least some of the users associated with the geographical data, the second rank being based on browser history data associated with the user At step 509, the server 116 generates the first rank Rg1 for each such website 3101-3120 from the first set 310 of websites. The parameters for the computation of first rank Rg1 are found on server 116. Step 509 also involves the computation of second rank Rh1 for each such website 3101-3120 from the first set 310 of websites. The parameters for the computation of first rank Rg1 are also found on the server 116.

Then, method 500 proceeds to the execution of step 511.

Step 511—generating the first rank and second rank for the given website of the second set of websites; the first rank being based on a popularity of the given website among at least some of the users associated with the aforementioned geographical data, and the second rank being based on the browser history data associated with the user At step 511, the server 116 generates first rank Rg2 for each such website 3201-3221 from the second set 320 of websites. The parameters for the computation of first rank Rg2 are found on server 116. Step 509 also involves the computation of second rank Rh2 for each such website 3101-3120 from the second set 320 of websites. The parameters for the computation of first rank Rg2 are also found on server 116.

Then, method 500 proceeds to the execution of step 513.

Step 513—generating a combined rank based on the first and second rank for each website from the first set of websites and the first and second rank for each website from the second set of websites At step 513, the server 116 generates the combined rank Rcom for each website 3101-3121 from the first set 310 of websites and for each website 3201-3221 from the second set 320 of websites, as shown in the table in FIG. 3. As an example, the combined rank Rcom1 for the first set 310 of websites is computed as Rcom1=Rg1+Rh1, and combined rank Rcom2 for the second set 320 of websites is computed as Rcom2=Rg2+Rh2.

Then, method 500 proceeds to the execution of step 515.

Step 515—transmitting to the electronic device an array of websites, an array of websites from the first set of websites and second set of websites, the array having been selected based on the combined rank being greater than a first threshold value; the web sites in the array being ranked and visually organized d according to the combined rank It should be recalled that the server 116 has the pre-set first threshold value T1. At step 515, the server 116 transmits to the electronic device 102, via the communication network, an array of websites whose combined rank Rcom is greater than the first threshold value T1; that said, the websites are organized in the quick-access field according to combined rank.

Modifications to the variants described above for the implementation of the non-limiting embodiments of the present technology. The preceding description is provided solely as an example and implies no particular limitations. Thus, the scope of this technical solution is limited solely by the scope of the appended claim.

The invention claimed is:

1. A method of selecting websites for displaying in a quick-access field in a web browser, the web browser executable by an electronic device, the electronic device being configured to connect to a server via a communication network, the method executable by the electronic device, the method comprising:
    authenticating a user, the authenticating being executed in response to receiving a user request from a user, the user request including geographical data;
    receiving, via the communication network from the server, a first set of websites from among a totality of websites; the first set of websites having been selected based on the geographical data;
    receiving, via the communication network from the server, a first rank for a given website of the first set of websites; the first rank having been calculated based on a popularity of the given website among at least some of users associated with the geographical data;
    generating a second rank for the given website based on the browser history data associated with the user;
    extracting browser history data associated with the user;
    creating a second set of websites based on the browser history data;
    receiving, from the server, at least one parameter associated with a popularity of each website from the second set of websites among at least some of the users associated with the geographical data;
    generating a first rank and a second rank for each website from among the second set of websites; the generating the first rank being based on the popularity of the website among at least some of the users associated with the aforementioned geographical data, and the generating the second rank being based on the browser history data associated with the user;
    generating a combined rank based on a sum of the first and second rank for each website from the first set of websites and a sum of the first and second rank for each website from the second set of websites;
    displaying, in the quick-access field, an array of websites from the first set of websites and second set of websites, the array having been selected based on the combined rank being greater than a first threshold value; the web sites in the array being ranked and visually organized according to the combined rank.

2. The method of claim 1, wherein the generating the combined rank comprises computing a sum of the first rank and second rank.

3. The method of claim 1, wherein responsive to the second rank of the given website being greater than a second threshold value, the method further comprises:
    labeling the given website for displaying in a fixed part of the quick-access field;
    and wherein responsive to the second rank of the given website being lesser than the second threshold value:
        labeling the given website for displaying in a variable part of the quick-access field.

4. The method of claim 1, wherein the browser history data comprises at least one of:
    user history of websites visited,
    user search logs,
    user bookmarks, and
    user "cookie" files.

5. The method of claim 4, wherein the method further comprises, prior to the extracting the browser history data, at least one of the following:
    transmitting, to the server a request for additional server-stored browser history data associated with the user,
    transmitting, to the server a request for a user behavior profile associated with the user, based on the browser history data associated with the user.

6. The method of claim 4, wherein the method further comprises tracking, within a pre-determined interval of time, the browser history data associated with the user.

7. The method of claim 5, wherein the method further comprises tracking, within the pre-determined interval of time, at least one of:
    additional browser history data associated with the user;
    user behavior profile associated the user, based on the browser history data associated with the user.

8. The method of claim 2, wherein the method further comprises replacing at least one website labeled for displaying in the variable part of the quick-access field with another website on the basis of a change in the second rank assigned to the at least one website within a pre-determined time interval.

9. The method of claim 2, wherein the method further comprises keeping the website labeled for displaying in the fixed part of the quick-access field without replacing with another website irrespective of the user interactions with the quick-access field.

10. The method of claim 1, wherein the combined rank of the given website depends on the cost of its addition to the quick-access field in the web browser.

11. The method of claim 1, wherein the extracting the browser history data associated with the user is executed during installation of the web browser.

12. The method of claim 1, wherein the extracting the browser history data associated with the user is executed during the user's first authentication in the web browser.

13. The method of claim 1, wherein the generating the first rank of the given website of the first set of websites and the first rank of the given website of the second set of websites based on the popularity of the website among at least some of the users associated with the aforementioned geographical data, is based on at least one of:
   frequency of visits,
   time spent on the website,
   intensity of navigation element use,
   full viewing of content,
   duration of content viewing,
   number of clicks, and
   number of links.

14. The method of claim 4, wherein generating the second rank of the given website of the first set of websites and of the given website of the second set of websites based on the browser history data linked to the user, is based on at least one of
   frequency of visits,
   intensity of navigation element use,
   full viewing of content,
   duration of content viewing,
   clickstream,
   completed purchases,
   orders,
   comments,
   feedback,
   posts, and
   statements.

15. The method of claim 1, wherein authenticating the user comprises executing authentication in the web browser pre-installed on the electronic device.

16. The method of claim 1 wherein authenticating the user comprises executing authentication of the user in their account.

17. The method of claim 1, wherein as a result of authentication of the user, the electronic device receives a request for the installation of a web browser.

18. A method of selecting websites for displaying in a quick-access field in a web browser, the web browser executable by an electronic device, the electronic device being configured to connect to a server via a communication network, the method executable by the server, the method comprising:
   receiving, via the communication network from the electronic device, geographical data associated with the user;
   receiving browser history data associated with the user;
   selecting a first set of websites from a totality of websites, the first set of websites being associated with the aforementioned geographical data;
   selecting a second set of websites based on the browser history data associated with the user;
   generating a first rank and a second rank for a given website of the first set of websites; the first rank being based on a popularity of the given website among at least some of the users associated with the geographical data, the second rank being based on browser history data associated with the user;
   generating the first rank and second rank for the given website of the second set of websites; the first rank being based on a popularity of the given website among at least some of the users associated with the aforementioned geographical data, and the second rank being based on the browser history data associated with the user;
   generating a combined rank based on a sum of the first and second rank for each website from the first set of websites and a sum of the first and second rank for each website from the second set of websites;
   transmitting to the electronic device an array of websites, an array of websites from the first set of websites and second set of websites, the array having been selected based on the combined rank being greater than a first threshold value; the web sites in the array being ranked and visually organized according to the combined rank.

19. An electronic device for the selection of websites for the quick-access field in the web browser, implemented with the capability of connecting with the server via the communication network, containing a display screen, a user input device, a data storage computer device, machine-readable information media containing machine-readable commands, and a processor connected to a display screen, a user input device, a data storage computer device, and implemented with the capability of accessing machine-readable commands, under whose implementation the processor is executed to support:
   authenticate a user, the authenticating being executed in response to receiving a user request from a user, the user request including geographical data;
   receive, via the communication network from the server, a first set of websites from among a totality of websites; the first set of websites having been selected based on the geographical data;
   receive, via the communication network from the server, a first rank for a given website of the first set of websites; the first rank having been calculated based on a popularity of the given website among at least some of users associated with the geographical data;
   generate a second rank for the given website based on the browser history data associated with the user;
   extract browser history data associated with the user;
   create a second set of websites based on the browser history data;
   receive, from the server, at least one parameter associated with a popularity of each website from the second set of websites among at least some of the users associated with the geographical data;
   generate a first rank and a second rank for each website from among the second set of websites; the generating the first rank being based on the popularity of the website among at least some of the users associated with the aforementioned geographical data, and the generating the second rank being based on the browser history data associated with the user;
   generate a combined rank based on a sum of the first and second rank for each website from the first set of websites and a sum of the first and second rank for each website from the second set of websites;
   display, in the quick-access field, an array of websites from the first set of websites and second set of websites, the array having been selected based on the combined rank being greater than a first threshold value; the web sites in the array being ranked and visually organized according to the combined rank.

* * * * *